(12) United States Patent
Di Mattia

(10) Patent No.: US 11,552,929 B2
(45) Date of Patent: Jan. 10, 2023

(54) COOPERATIVE ADAPTIVE NETWORK SECURITY PROTECTION

(71) Applicant: Fortinet, Inc., Sunnyvale, CA (US)

(72) Inventor: Aldo Di Mattia, Rome (IT)

(73) Assignee: Fortinet, Inc., Sunnyvale, CA (US)

( * ) Notice: Subject to any disclaimer, the term of this patent is extended or adjusted under 35 U.S.C. 154(b) by 719 days.

(21) Appl. No.: 16/435,863

(22) Filed: Jun. 10, 2019

(65) Prior Publication Data
US 2020/0389430 A1    Dec. 10, 2020

(51) Int. Cl.
*H04L 29/06* (2006.01)
*H04L 9/40* (2022.01)

(52) U.S. Cl.
CPC ........ *H04L 63/0218* (2013.01); *H04L 63/105* (2013.01); *H04L 63/1416* (2013.01)

(58) Field of Classification Search
CPC .............. H04L 63/0218; H04L 63/105; H04L 63/1416; H04L 63/1458; H04L 67/30
See application file for complete search history.

(56) References Cited

U.S. PATENT DOCUMENTS

| | | | | |
|---|---|---|---|---|
| 2015/0074810 A1* | 3/2015 | Saher | ................. | H04L 63/1491 726/23 |
| 2017/0149821 A1* | 5/2017 | Li | ......................... | H04L 63/101 |
| 2017/0208077 A1* | 7/2017 | Freedman | ......... | G06F 16/24568 |
| 2019/0020667 A1* | 1/2019 | Parker | ................. | H04L 63/1416 |
| 2020/0296139 A1* | 9/2020 | Fainberg | ............... | H04L 63/105 |

* cited by examiner

*Primary Examiner* — Joseph P Hirl
*Assistant Examiner* — Thomas A Gyorfi
(74) *Attorney, Agent, or Firm* — Law Office of Dorian Cartwright; Dorian Cartwright

(57) ABSTRACT

Systems and methods for improving the catch rate of attacks/malware by a cooperating group of network security devices are provided. According to one embodiment, a security management device configured in a protected network, maintains multiple dynamic IP address lists including an NGFW deep detection list, a DDoS deep detection list, a NGFW block list and a DDoS block list. The security management device, continuously updates the lists based on updates provided by a cooperating group of network security devices based on network traffic observed by the network security devices. In response to receipt of a request from a NGFW device or a DDoS mitigation device associated with the protected network, the security management device provides the requestor with the requested dynamic IP address lists for use in connection with processing network traffic by the requestor.

12 Claims, 10 Drawing Sheets

| SEQ.# | NAME | SOURCE | DESTINATION | SCHEDULE | SERVICE | APPLICATIONS | URL CATEGORY | ACTION | NAT | SECURITY PROFILE |
|---|---|---|---|---|---|---|---|---|---|---|
| | LAN(PORT1)→WAN1(PORT1)(1-1) | | | | | | | | | |
| 1 | | GFW BLOCK LIST | ALL | ALWAYS | DNS HTTP HTTPS | | CUSTOM 1 | DENY | | |
| 2 | | NGFW DEEP DETECTION LIST | ALL | ALWAYS | DNS HTTP HTTPS | BUSINESS CLOUD.IT COLLABORATION | CUSTOM 1 | ACCEPT | DISABLED | AV |
| 3 | | VIPB LIST | ALL | ALWAYS | DNS HTTP HTTPS | BUSINESS CLOUD.IT COLLABORATION | CUSTOM 1 | ACCEPT | DISABLED | AV |
| 4 | | ALL | ALL | ALWAYS | DNS HTTP HTTPS | BUSINESS CLOUD.IT COLLABORATION SOCIAL.MEDIA UPDATE | CUSTOM 1 | ACCEPT | ENABLED | |

FIG. 5

| NAME | SUBNET ID | IP VERSION | IPv4/NETMASK | IPv6/PREFIX | SPP | ALTERNATE SPP ENABLE | ALTERNATE SPP | THRESHOLD(PPS) | COMMENT | | |
|---|---|---|---|---|---|---|---|---|---|---|---|
| DDoS BLOCK LIST | 1 | IPv1 | BLOCK | — | BLOCK | DISABLE | — | — | | ✎ | ▢ |
| DDoS DEEP DETECTION LIST | 2 | IPv1 | BLOCK | — | SPP-1 | DISABLE | — | — | | ✎ | ▢ |
| VIPB | 1 | IPv1 | BLOCK | — | SPP-2 | DISABLE | — | — | | ✎ | ▢ |
| 1 | 26 | IPv1 | 26.0.0.0/8 | — | SPP-0 | ENABLE | SPP-0 | 20000 | VERISIGN-1 | ✎ | ▢ |
| 2 | 10 | IPv1 | 10.0.0.0/8 | — | SPP-0 | ENABLE | SPP-0 | 2500 | VERISIGN-2 | ✎ | ▢ |

FIG. 6

COOPERATIVE ADAPTIVE NETWORK SECURITY PROTECTION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2019, Fortinet, Inc.

BACKGROUND

Field

Embodiments of the present invention generally relate to network security. In particular, embodiments of the present invention relate to cooperative adaptive network security protection involving communication among multiple network security devices associated with a protected network so as to improve the catch rate and facilitate blocking of attacks/malware at the first network security device exposed to the network traffic at issue by, for example, allowing cooperating network security devices to override default security protection profiles and/or add Internet Protocol (IP) addresses to centrally maintained dynamic lists of IP addresses associated with specific actions or explicit rules.

Description of the Related Art

With regard to computers and intelligent devices, and particularly devices that are connected to the Internet and operate using Internet Protocol (IP) addresses, there unfortunately are situations in which a third party may take over, or otherwise occupy with nefarious purpose, the computer or intelligent device. There are available security systems that monitor for such threats, using multiple types of security devices. Non-limiting examples of theses security devices include gateway devices, firewalls, Unified Threat Management (UTM) appliances, web application firewalls, endpoint security solutions running on client devices, sandbox appliances, message (e.g., email) security devices, and distributed denial service (DDoS) mitigation appliances.

Such security devices can include a set of security rules that are applied to network traffic to perform inspection, scanning, filtering, blocking, logging, signature matching, traffic rate analysis, reputation monitoring, behavior analysis and the like to identify and block potential malicious content. Further, while monitoring and blocking the malicious content, some of these security devices may create and maintain their own white lists, black lists, and/or grey lists of known non-malicious and identified malicious source IP addresses based on threat scores and/or reputation information associated with observed content, so as to allow, block or apply additional scrutiny to traffic originating from the data/content coming from these lists in future.

One limitation associated with existing security infrastructures used by enterprises, however, is the lack of communication among the individual network security devices. As such, the individual network security devices are not taking advantage of the network traffic analysis performed by other network security devices deployed within the enterprise network and enterprises are not fully benefiting from the synergies that could be achieved as a result of cooperation among the network security devices.

In view of the foregoing, there is a need for increased cooperation among network security devices to improve the catch rate and facilitate blocking of attacks/malware at the first network security device exposed to the network traffic at issue.

SUMMARY

Systems and methods are described for improving the catch rate of attacks/malware by a cooperating group of network security devices. According to one embodiment, a security management device configured in a protected network, maintains multiple dynamic IP address lists including a next generation firewall (NGFW) deep detection list, a Distributed Denial of Service (DDoS) deep detection list, a NGFW block list and a DDoS block list. Further, the security management device, receives updates from a cooperating group of network security devices associated with the protected network based on network traffic observed by the network security devices. The security management device also receives requests from a NGFW device and a DDoS mitigation device associated with the protected network for one or more of the dynamic IP address lists. In response to receipt of the requests, the security management device provides the NGFW device and the DDoS mitigation device with the requested dynamic IP address lists to process network traffic.

Other features of embodiments of the present disclosure will be apparent from accompanying drawings and detailed description that follows.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 5 illustrates an exemplary administrative security policy configuration interface for a NGFW device (in the form of any of a gateway device, a firewall device or a UTM appliance) in accordance with an embodiment of the present invention.

FIG. 6 illustrates an exemplary administrative security policy configuration interface for a DDoS mitigation device in accordance with an embodiment of the present invention.

DETAILED DESCRIPTION

Figure 1:
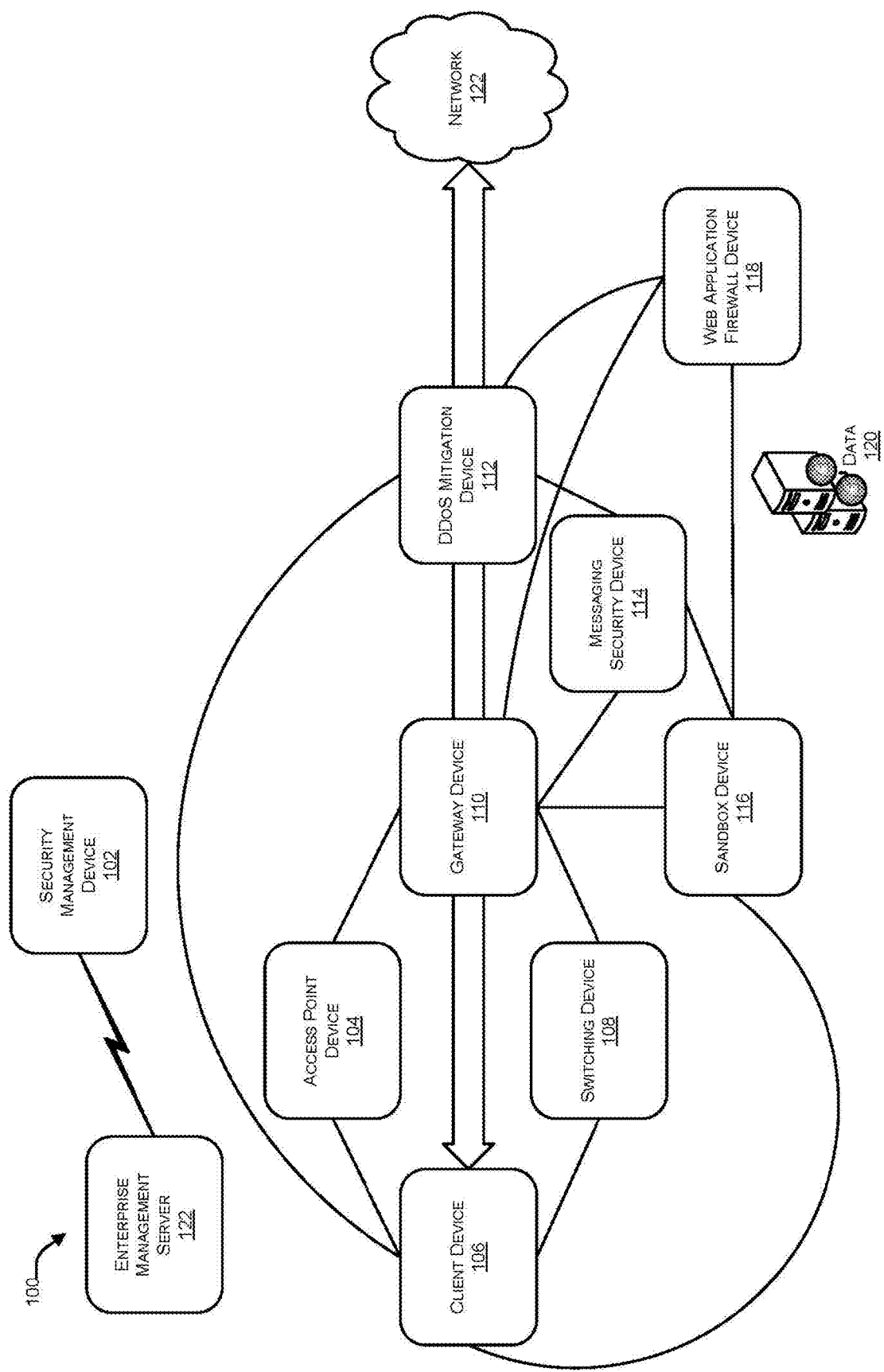
FIG. 1 illustrates cooperation among multiple network security devices in accordance with an embodiment of the present invention.

Systems and methods are described for improving the catch rate of attacks/malware by a cooperating group of network security devices. In one embodiment, four types of dynamic IP lists are maintained by a security management device. In one embodiment, two of the dynamic IP lists, e.g., a next generation firewall (NGFW) deep detection list and a Distributed Denial of Service (DDoS) deep detection list (described further below), are centrally maintained by a security management device of a protected network and are intended to configure NGFW devices and DDoS mitigation appliances associated with the protected network, respectively, to apply a different NGFW device security protection profile and a different DDoS mitigation appliance security protection profile, respectively, to network traffic associated with IP addresses appearing on the dynamic IP lists through explicit rules. In one embodiment, the other two dynamic IP lists, e.g., the NGFW block list and the DDoS block list (described further below), are centrally maintained by the security management device and are intended for use in connection with configuring NGFW devices and DDoS mitigation appliances, respectively, to block without further analysis network traffic directed to a destination IP address or originated from a source IP address attempting to traverse the network security device at issue.

According to one embodiment, these dynamic IP lists may be continuously updated by a cooperating group of network security devices, including one or more of a client device running an endpoint security solution, a gateway device, a firewall device, a DDoS mitigation appliance, a sandbox appliance, a messaging security appliance and a web application firewall, based on network traffic observed by the cooperating group of network security devices. For example, each network security device of the cooperating group of network security devices may apply a locally configured set of rules or an algorithm to observed network traffic to identify source and/or destination Internet Protocol (IP) addresses to be added to one or more of the dynamic IP lists.

According to one embodiment, network security devices of the cooperating group of network security devices (e.g., NGFW devices and DDoS mitigation devices) for which the dynamic IP lists are intended can periodically retrieve the appropriate dynamic IP lists from the security management device and thereafter process (e.g., inspect, scan, filter, block, log, etc.) network traffic in accordance with explicit rules/actions to be applied to network traffic associated with an IP address on the dynamic IP lists. For example, a DDoS mitigation device will block without further analysis network traffic originated from a source IP address on the DDoS block list. As those skilled in the art will appreciate, in this manner, observations made by one or more network security devices of a cooperating group of network security devices can improve the catch rate and likelihood that attacks/malware are blocked in the first tier of the cooperating group of network security devices.

In one embodiment, another type of dynamic list, e.g., a dynamic hyper-sandbox list (described further below), is maintained by a sandbox appliance of a protected network and is intended to cause the sandbox appliance to use a different scan profile and different pre-filter settings in connection with performing a behavior analysis of a file associated with an IP address or an email address on the dynamic hyper-sandbox list. Similar to the dynamic IP address lists described above that are centrally maintained by a security management device, the dynamic hyper-sandbox list can be updated by network security devices (e.g., a gateway device, a firewall device, a unified threat management (UTM) appliance, a client device running an endpoint security solution, a messaging security appliance, and a web application firewall) associated with a cooperating group of network security devices. For example, any one of these network security devices intercepting from a specific IP address or a specific email address a number of attacks/malware exceeding a predetermined or configurable threshold during a predetermined or configurable timeframe may request the sandbox appliance to insert the specific IP address or the specific email address into the dynamic hyper-sandbox with a time defined by the administrator of the network security device at issue.

In one embodiment, an enterprise management server (EMS) performs an evaluation of the behaviors of clients within a protected network. In one aspect, the EMS administrator can define a list of VIP clients, for example, at least two or three clients for every group, where a group contains all clients with the same settings (e.g., operating system (OS) version, installed software, software versions, etc.) for which certain resource utilization limits are specified in the form of VIP information. The EMS periodically obtains the following information for each client: (i) its processes list; (ii) the CPU/RAM utilization for every process; and (iii) the network utilization for every process. The EMS may then compare the obtained information with corresponding limits specified by the VIP information. The EMS administrator may also define a percentage of difference between VIP and normal clients. For example, if a normal client (not a VIP client) has a statistic higher than "VIP+percentage" or a different process list then the EMS may insert the client's IP address into one or more of the dynamic hyper-sandbox list, the NGFW deep detection list, and the DDoS deep detection list for a definable time. The EMS may also direct all endpoint security solutions running client devices in the protected network to change the security profile for the client's IP address.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrase "NGFW deep detection list" generally refers to a list of IP addresses for which associated network traffic is to receive different treatment than the default security protection profile defined on a firewall device. For example, network traffic originating from a source IP address or destined for a destination IP address on the NGFW deep detection list may be associated with a different next generation firewall device (NGFW) protection profile, thereby causing an NGFW device, such as a FORTIGATE network security appliance available from the assignee of the present invention, to apply one or more of different antivirus, Intrusion Prevention System (IPS), and/or access control profiles and may also perform deep inspection and/or different logging treatment than the default security protection profile. In one embodiment, the NGFW deep detector list is centrally maintained by a security management device, such as a FORTIMANAGER management appliance available from the assignee of the present invention, and participating network security devices within the protected network can report source/destination IP addresses to be added to the NGFW deep detection list based on locally configured rules or algorithms. The relevant network security devices (e.g., NGFW devices) may update their local NGFW deep detection lists by periodically retrieving the centrally maintained NGFW deep detection list from the security management device.

The phrase "DDoS deep detection list" generally refers to a list of IP addresses for which associated network traffic is to receive different treatment than the default security protection profile defined on a DDoS mitigation device. For example, network traffic originating from a source IP address or destined for a destination IP address on the DDoS deep detection list may be associated with a different DDoS protection profile, thereby causing different traffic analysis to be performed and may also perform deep inspection and/or different logging treatment than the default security protection profile. In one embodiment, the DDoS deep detector list is centrally maintained by a security management device and participating network security devices within the protected network can report source/destination IP addresses to be added to the DDoS deep detection list based on locally configured rules or algorithms. The relevant network security devices (e.g., DDoS mitigation devices) may update their local DDoS deep detection lists by periodically retrieving the centrally maintained DDoS deep detection list from the security management device.

The phrase "NGFW block list" generally refers to a list of IP addresses that are to be blocked by NGFW devices. For example, a NGFW device configured with a NGFW block list blocks network traffic originating from an IP address on the NGFW block list without further analysis, thereby increasing the likelihood of malicious network traffic being blocked by the first network security device processing the network traffic at issue. In one embodiment, the NGFW block list is centrally maintained by a security management device and participating network security devices within the protected network can report source/destination IP addresses to be added to the NGFW block list based on locally configured rules or algorithms. The relevant network security devices (e.g., NGFW mitigation devices) may update their local DDoS block lists by periodically retrieving the centrally maintained DDoS block list from the security management device.

The phrase "DDoS block list" generally refers to a list of IP addresses that are to be blocked by DDoS mitigation devices. For example, a DDoS mitigation device configured with a DDoS block list blocks network traffic originating from an IP address on the DDoS block list without further analysis, thereby increasing the likelihood of malicious network traffic being blocked by the first network security device processing the network traffic at issue. In one embodiment, the DDoS block list is centrally maintained by a security management device and participating network security devices within the protected network can report source/destination IP addresses to be added to the DDoS block list based on locally configured rules or algorithms. The relevant network security devices (e.g., DDoS mitigation devices) may update their local DDoS block lists by periodically retrieving the centrally maintained DDoS block list from the security management device.

The phrase "static hyper-sandbox list" generally refers to a static list of IP addresses, subnets or protected email addresses configured within a sandbox appliance by a network administrator that have a different scan profile and/or different pre-filter settings for the sandbox appliance. For example, a sandbox appliance, such as the FORTISANDBOX sandbox appliance available from the assignee of the present invention may use this list to improve the catch rate for malicious files.

The phrase "dynamic hyper-sandbox list" generally refers to a dynamic list of IP addresses, NETs or protected email addresses reported to or updated by participating network security devices within a protected network that are to have a different scan profile and/or different pre-filter settings applied by a sandbox appliance. Like the hyper-sandbox list, sandbox appliances use the dynamic hyper-sandbox list to improve the catch rate for malicious files.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The phrases "security device" and "network security device" generally refer to a hardware or virtual device or network appliance that provides security services to a private network, for example, providing one or more of data privacy, protection, encryption and security. A network security device can be a device providing one or more of the following non-limiting features: network firewalling, VPN, antivirus, intrusion prevention (IPS), content filtering, data leak prevention, anti-spam, antispyware, logging, reputation-based protections, event correlation, network access control, denial of service (DoS) and/or distributed DoS (DDoS) detection/mitigation, vulnerability management, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

Embodiments of the present invention are described below with reference to a cooperating group of network security devices that may communicate with each other directly or indirectly via a security management device. While the particular mechanism by which the network security devices of the cooperating group of network security devices communicate with each other is not central to the subject matter described herein, for purposes of completeness it is noted that in one embodiment the communications may be via a cooperative security fabric as described in copending U.S. patent application Ser. No. 15/855,230, filed Dec. 27, 2017 and entitled "Building a Cooperative Security Fabric of Hierarchically Interconnected Network Security Devices," which is hereby incorporated by reference in its entirety for all purposes. In such cases, the cooperating group of network security devices may be more specifically referred to as security fabric devices.

FIG. 1 illustrates cooperation among multiple network security devices in accordance with an embodiment of the present invention. In the context of the present example, a security fabric 100 may comprise a group of network security devices operatively coupled with a security management device 102 for improving the catch rate of attacks/malware by a cooperating group of network security devices. The network security devices may include one or more of an access point device 104, a client device 106, a switching device 108, a gateway device 110, a Distributed Denial of Service (DDoS) mitigation device 112, a messaging security device 114, a sandbox device 116 and web application firewall device 118 operatively coupled with each other through network 122 (e.g., a protected network, such as an enterprise network). Further, data 120 associated with processes performed by various network security devices may be stored in a cloud storage associated with network 122.

Those skilled in the art will appreciate that, network 122 can be wireless network, wired network or a combination thereof that can be implemented as one of the different types of networks, such as Intranet, Local Area Network (LAN), Wide Area Network (WAN), Internet, and the like. Further, network 122 can either be dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

In an embodiment, security management device 102 maintains various dynamic IP address lists including deep detection lists (e.g., a NGFW deep detection list and a DDoS deep detection list), and block lists (e.g., a NGFW block list and a DDoS block list). The deep detection lists may be dynamic lists of IP addresses updated with input from the group of network security devices. The deep detection lists can be used to apply a different security profile or a different protection profile for specific IP address through explicit rules. Further, the block lists may be dynamic lists of IP address updated with input from the group of network security devices, which can be used to block attacks from/to specific IP addresses through explicit rules.

In an embodiment, the NGFW deep detection list and DDoS deep detection list can be used to configure NGFW devices (e.g. gateway device 110 and web application firewall device 118) and DDoS mitigation appliances (e.g., as DDoS mitigation device 112) associated with the protected network, respectively. Gateway device 110 and DDoS mitigation device 112 may then apply a different NGFW device security protection profile and a different DDoS mitigation appliance security protection profile, respectively, to network traffic associated with IP addresses appearing on the dynamic IP lists through explicit local rules.

In one embodiment, a network administrator can configure members of the cooperating group of network security devices to add IP addresses to one or more of the dynamic IP address lists maintained by security management device 102 responsive to network traffic observed by the members meeting certain criteria. For example, the network administrator can configure the members to apply one or more rules/filters or an algorithm specifying conditions under which a source and/or a destination IP address contained in the observed network traffic is to be added to one or more of the dynamic IP address lists maintained by security management device 102.

For purposes of configuring members of the cooperating group of network security devices based on one or more of the dynamic IP address lists, in one embodiment, the network administrator can link a specific security protection profile with a specific dynamic IP address list. As such, when the DDoS deep detection list is applied locally on DDoS mitigation device 112, default security protection profiles that would ordinarily be applied to network traffic being processed by DDoS mitigation device 112 can be overridden and replaced by the specific security protection profile linked to the DDoS deep detection list when the network traffic contains a source IP address and/or a destination IP address on the DDoS deep detection list. Similarly, when the NGFW deep detection list is applied locally on gateway device 110, default security protection profiles that would ordinarily be applied to network traffic being processed by gateway device 110 can be overridden and replaced by the specific security protection profile linked to the NGFW deep detection list when the network traffic contains a source IP address and/or a destination IP address on the NGFW deep detection list. Depending on the particular implementation and the network security device for which the IP address list is intended for, the specific security profile can contain different antivirus (AV), Intrusion Prevention System (IPS), and Access Control (AC) profiles specified by the network administrator.

In one embodiment, the NGFW block list and the DDoS block list may also be used in connection with configuring gateway device 110 and DDoS mitigation device 112, respectively, to block network traffic directed to a destination IP address on the block list or originated from a source IP address on the block list attempting to traverse the network security device at issue. Matching network traffic may be blocked by the configured network security device without further analysis. In an example, the block lists applied by members of the cooperating group of network security devices to observed network traffic can be periodically replaced with or updated based on the dynamic block lists centrally maintained by security management device 102 and can be used to configure the members using such block lists to block attacks originating from or directed to a specific IP addresses through explicit rules. For example, all observed network traffic by DDoS mitigation device 112 containing a source IP address on the DDoS block list can be blocked without further analysis by DDoS mitigation device 112 and similarly, all observed network traffic by gateway device 110 containing a source IP address on the NGFW block list can be blocked by gateway device 110 without further analysis.

In an embodiment, a security management device 102 may provide a menu or an interface through which the network administrator can view various lists and can also add/delete IP addresses to/from the lists. As noted above, one or more of the dynamic IP address lists maintained by security management device 102 may be updated by members of the cooperating group of network security devices based on respective local rules. For example, if a messaging security device 114 receives more than a predefined or configurable threshold number of spam and/or malware infected emails within a predefined or configurable timeframe from the same Simple Mail Transfer Protocol (SMTP) server having a particular IP address, then messaging security device 114 may direct security management device 102 to add the particular IP address onto one or both of the NGFW block list and the DDoS block list with or without specifying a time limit for the particular IP address to remain on the list. Conversely, if messaging security device 114 receives more than "X" emails per "Y" seconds from same SMTP server having a particular IP address without spam/malware, then messaging security device 114 may direct security management device 102 to add the particular IP address onto one or both of the NGFW deep detection list and the DDoS deep detection list with or without specifying a time limit for the particular IP address to remain on the list.

In another non-limiting example, if web application firewall device 118 observes more than "X" requests directed to protected applications per "Y" unit(s) of time from the same source IP address and identified by web application firewall device 118 as containing one or more attacks, then web application firewall device 118 may direct security management device 102 to add the source IP address onto one or both of the NGFW block list and the DDoS block list with or without specifying a time limit. Conversely, if web application firewall device 118 receives more than "X" requests directed to protected applications per "Y" unit(s) of time from the same source IP address but none are identified by web application firewall device 118 as containing one or more attacks, then web application firewall device 118 may direct security management device 102 to add the source IP address onto one or both of the NGFW deep detection list and the DDoS deep detection list with or without specifying a time limit.

In yet another example, if an endpoint security solution (not shown) running on client device 106 detects more than "X" viruses per "Y" unit(s) of time from the same IP address, then endpoint security solution may direct security management device 102 to add the IP address onto one or both of the NGFW block list and the DDoS block list with or without specifying a time limit. Conversely, if the endpoint security solution observes suspicious network traffic containing an unconfirmed attack/malware from a particular IP address, then the endpoint security solution may direct security management device 102 to add the particular address onto one or both of the NGFW deep detection list and the DDoS deep detection list with or without specifying a time limit.

In yet another non-limiting example, if gateway device 110 observes more than "X" unit(s) of suspicious network traffic per "Y" unit(s) of time from the same IP, then gateway device 110 may add the IP into the DDoS block list with or without specifying time limit.

According to one embodiment, network security devices participating in the cooperating group of network security devices (e.g., NGFW devices and DDoS mitigation devices) for which the dynamic IP lists are intended can periodically retrieve the appropriate dynamic IP lists from security management device 102. For example, gateway device 110 may retrieve the NGFW deep detection list and the NGFW block list from security management device 102 periodically (e.g., every X seconds, minutes or hours), responsive to a triggering event or on demand. Similarly, DDoS mitigation device 112 may retrieve the DDoS deep detection list and the DDoS block list from security management device 102 periodically (e.g., every X seconds, minutes, or hours), responsive to a triggering event or on demand. Alternatively or additionally, security management device may push dynamic IP lists to network security devices. In any event, once configured with one or more dynamic IP lists, these network security device at issue may process (e.g., inspect, scan, filter, block, log, etc.) network traffic in accordance with explicit rules/actions to be applied to the network traffic associated with an IP address on the dynamic IP lists. For example, DDoS mitigation device 112 may block without further analysis any observed network traffic originated from a source IP address on the DDoS block list. In this manner, observations made by the cooperating group of network security devices can improve the catch rate and likelihood that attacks/malware are blocked.

In an embodiment, sandbox device 116 may maintain a static hyper-sandbox list including a static list of IP addresses, subnets or protected email addresses that are associated with a different scan profile and/or different pre-filter settings for sandbox device 116. Sandbox device 116 may also maintain a dynamic hyper-sandbox list to use a scan profile and pre-filter settings in connection with performing a behavior analysis of a file associated with an IP address or an email address on the dynamic hyper-sandbox list. An administrator can configure a static hyper-sandbox list of source IP addresses, subnets or email address directly into sandbox device 116. The list may cause sandbox device 116 to apply a different scan profile and/or different pre-filter settings to a file under analysis associated with an email address, subnet or IP address on the list. When a network security device (e.g. gateway device 110, messaging security device 114, web application firewall device 118, endpoint security solution running on client device 110) sends a file to sandbox device 116 for analysis, sandbox device 116 may determine an IP address or an email address, for example, associated with the file and if the IP address or the email address is contained in the list then sandbox device 116 operates in accordance with a specific scan profile and/or pre-filter settings; otherwise, sandbox device 116 uses a default configured sandbox profile appropriate for the file at issue.

In an embodiment, the dynamic hyper-sandbox list may be updated by the group of network security devices in a manner similar to updating of the dynamic IP lists in security management device 102. Thus, the dynamic hyper-sandbox list may also be used to improve the catch rate for malicious files. In an implementation, gateway device 110 can cause sandbox device 116 to update a dynamic hyper-sandbox list by adding an IP address specified by gateway device 110. For example, if gateway device 110 makes a determination that a specific IP address or subnet is associated with a threat score higher than a configurable or pre-defined threshold then gateway device 110 may direct sandbox device 116 to insert the IP address or subnet into its dynamic hyper-sandbox list for a period of time configured by the administrator of gateway device 110.

In an implementation, the endpoint security solution running on client device 106 may direct sandbox device 116 to update the dynamic hyper-sandbox list with its own IP address. For example, if the endpoint security solution intercepts a number of attacks/malware higher than a pre-defined or configurable threshold, then the endpoint security solution may insert its own IP address onto the list with a time defined by the administrator of an enterprise management server 122.

In another non-limiting example, messaging security device 114 may be configured by local rules and/or an algorithm to direct sandbox device 116 to update the dynamic hyper-sandbox list with a specified IP address or email address based on certain conditions. If messaging security device 114 intercepts a number of phishing attempts, for example, higher than a pre-defined or configurable threshold within a time period, then messaging security device 114 may direct sandbox device 116 to insert the email address from which the phishing attempts originated into the list with a time defined by administrator of messaging security device 114.

In another non-limiting example, web application firewall device 118 may be configured to update the dynamic hyper-sandbox list based on observed requests meeting one or more conditions/thresholds. For example, if web application firewall device 118 receives perceived malicious requests directed to a protected server from a specific IP address exceeding a pre-defined or configurable threshold during a particular time interval, then web application firewall device 118 may direct sandbox device 116 to insert the IP address onto the dynamic hyper-sandbox list with a time defined by the administrator of the web application firewall device 118.

In an embodiment, an EMS 122 operatively coupled with security management device 102 may perform an evaluation of the behaviors of plurality of clients e.g., one or more of client devices 106 within the protected network. An EMS administrator can define a list of VIP (VIPB list) client devices, for example, at least two or three client devices for every group, where a group contains all client devices with the same or similar settings (e.g., operating system (OS) version, installed software, software versions,) for which certain resource utilization limits are specified in the form of VIP information. EMS 122 may periodically obtain the following information for each client: (i) its processes list; (ii) the CPU/RAM utilization for every process; and (iii) the network utilization for every process. The EMS 122 may then compare the obtained information with corresponding limits specified by the VIP information.

In one embodiment, the EMS administrator may define a percentage of difference between VIP and normal clients. For example, if a normal client (not a VIP client) has a statistic higher than "VIP+percentage" or a different process list, then the EMS 122 may cause the client's IP address to be added onto one or more of the dynamic hyper-sandbox list, the NGFW deep detection list, and the DDoS deep detection list for a definable time. The EMS 122 may also direct all endpoint security solutions running on client devices 106 in the protected network to change the security profile for the IP address of the client device. Therefore, the EMS 122 may be used to reduce the training costs (only for the VIP) and to individuate the most dangerous users.

Figure 2:
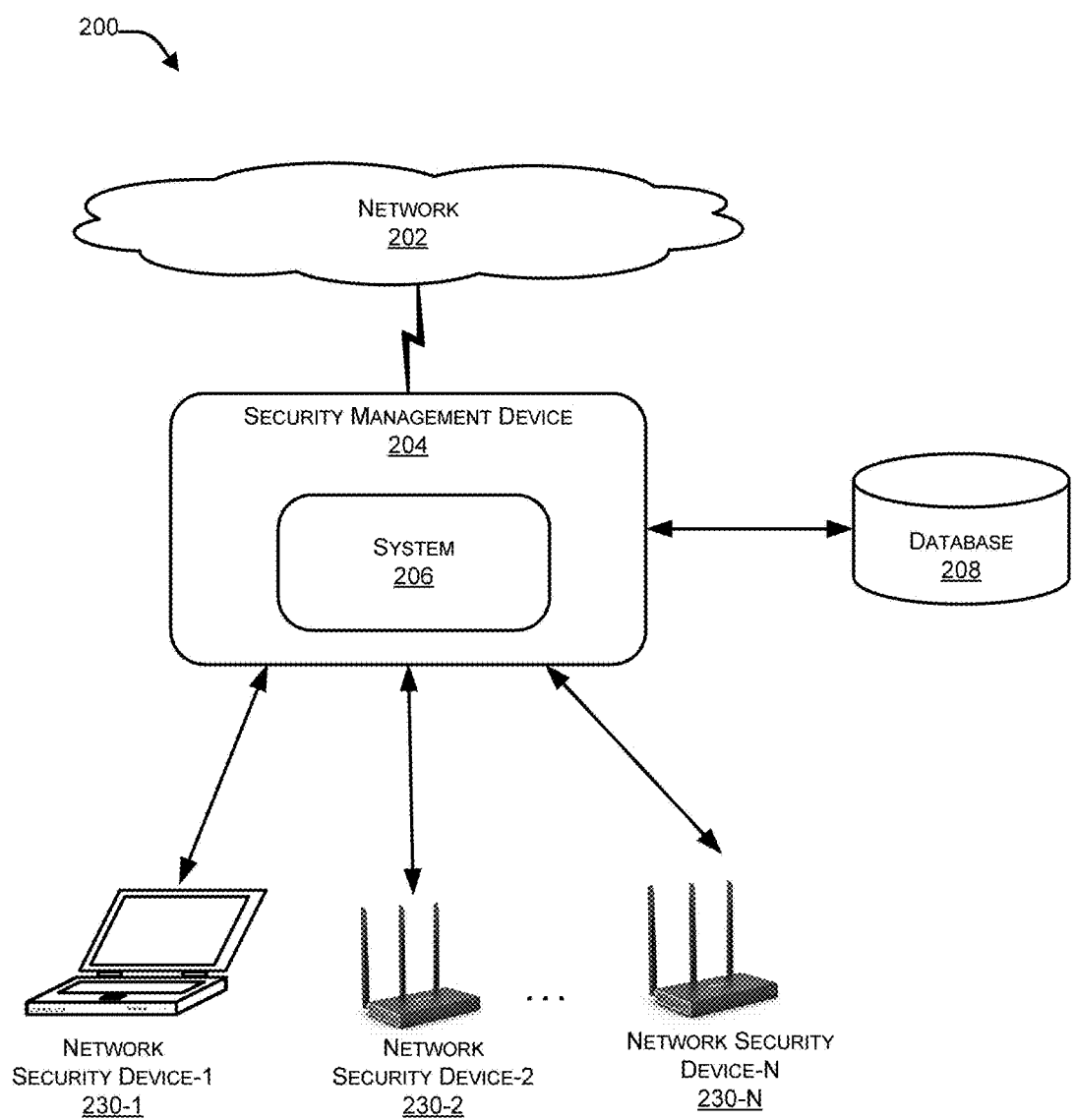
FIG. 2 illustrates an exemplary network architecture in which or with which embodiments of the present invention can be implemented.

FIG. 2 illustrates an exemplary network architecture 200 in which or with which embodiments of the present invention can be implemented. In the context of the present example, a system 206 may be implemented in a security management device 204 associated with multiple cooperating network security devices 230-1, 230-2 . . . 230-N (which may be collectively referred to herein as network security devices 230 and may be individually referred to herein as network security device 203) protecting a network 202. Network 202 can be wireless network, wired network or a combination thereof that can be implemented as one of the different types of networks, such as Intranet, Local Area Network (LAN), Wide Area Network (WAN), Internet, and the like. Further, data associated with processes performed by various network security devices 230 may be stored in a database 208 associated with network 202.

In one embodiment, each network security device 230 may be configured to report IP addresses to be included in any of one or more dynamic IP lists maintained by system 206 based on predefined rules/algorithms, and may also periodically retrieves appropriate IP lists for their own local use from system 206 to process received network traffic based on the retrieved IP lists. Network security devices 230 associated with system 206 may include a NGFW device, a gateway device, a firewall device, a sandbox appliance, a messaging security appliance, a web application firewall, a DDoS mitigation device and the like, which execute respective network security functionalities. Network security devices 230 may also include client or endpoint devices, including but not limited to, personal computers, smart devices, web-enabled devices, hand-held devices, laptops, mobile phones and the like, when running an endpoint security solution that is part of the cooperating network security devices. Like the other members of the cooperating network security devices, the endpoint security solution may also be configured to report IP addresses for inclusion by security management device 240 in one or more of the dynamic IP lists maintained by system 206. Exemplary functional components of system 206 in accordance with one embodiment are further explained with reference to FIG. 3.

Figure 3:
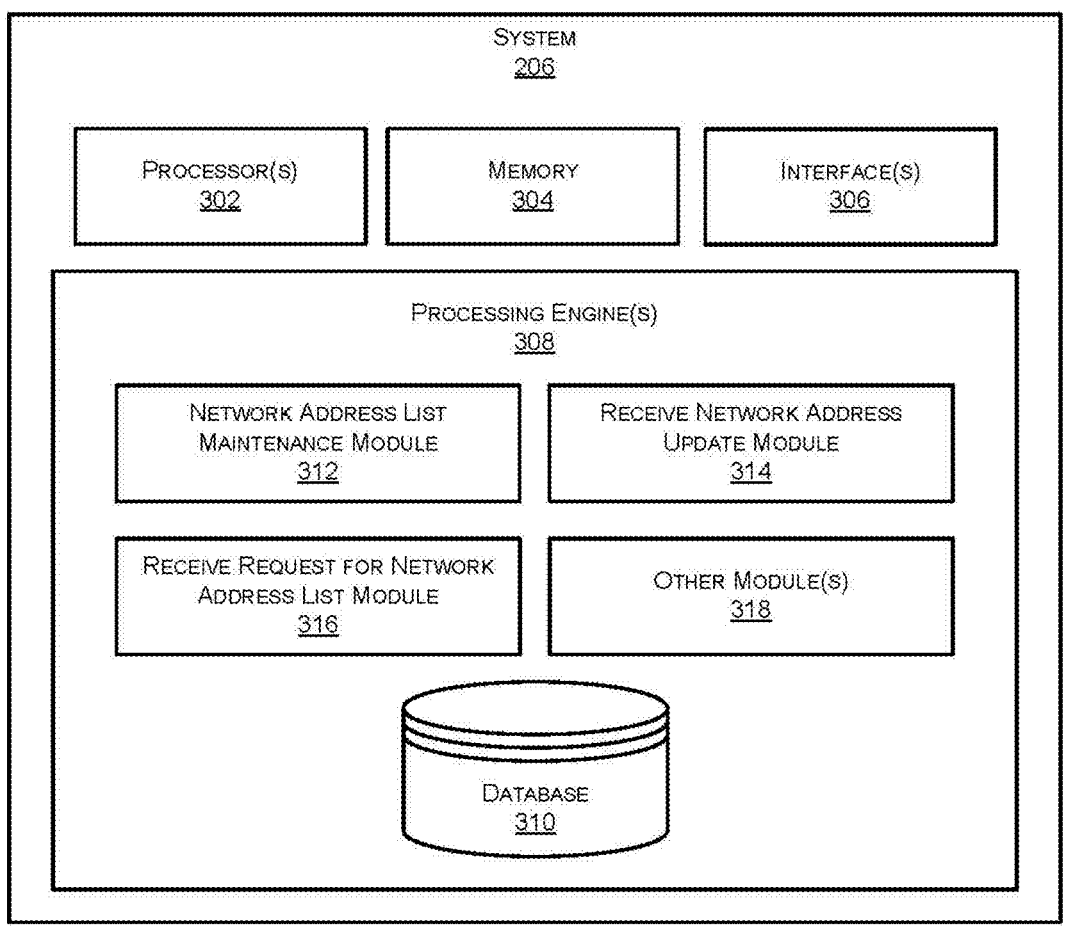
FIG. 3 illustrates an exemplary module diagram for centrally maintaining and distributing various static and dynamic lists of IP addresses in accordance with an embodiment of the present invention.

FIG. 3 illustrates an exemplary module diagram of system 206 for centrally maintaining and distributing various static and dynamic lists of IP addresses in accordance with an embodiment of the present invention. As illustrated, system 206 can include one or more processor(s) 302. Processor(s) 302 can be implemented as one or more microprocessors, microcomputers, microcontrollers, digital signal processors, central processing units, logic circuitries, and/or any devices that manipulate data based on operational instructions. Among other capabilities, processor(s) 302 are configured to fetch and execute computer-readable instructions stored in a memory 304 of system 206. Memory 304 can store one or more computer-readable instructions or routines, which may be fetched and executed to create or share the data units over a network service. Memory 304 can include any non-transitory storage device including, for example, volatile memory such as RAM, or non-volatile memory such as EPROM, flash memory, and the like. In an example embodiment, memory 304 may be a local memory or may be located remotely.

System 206 can also include one or more interface(s) 306. Interface(s) 306 may include a variety of interfaces, for example, interfaces for data input and output devices, referred to as I/O devices, storage devices, and the like. Interface(s) 306 may facilitate communication of system 206 with various devices coupled to security management device 204. Interface(s) 306 may also provide a communication pathway for one or more components of system 206. Examples of such components include, but are not limited to, processing engine(s) 308, and data 310.

Processing engine(s) 308 can be implemented as a combination of hardware and software or firmware programming (for example, programmable instructions) to implement one or more functionalities of processing engine(s) 308. In the examples described herein, such combinations of hardware and software or firmware programming may be implemented in several different ways. For example, the programming for the processing engine(s) 308 may be processor executable instructions stored on a non-transitory machine-readable storage medium and the hardware for processing engine(s) 308 may include a processing resource (for example, one or more processors), to execute such instructions. In the examples, the machine-readable storage medium may store instructions that, when executed by the processing resource, implement processing engine(s) 308. In such examples, system 206 can include the machine-readable storage medium storing the instructions and the processing resource to execute the instructions, or the machine-readable storage medium may be separate but accessible to system 206 and the processing resource. In other examples, processing engine(s) 308 may be implemented by electronic circuitry. Data 310 can include data that is either stored or generated as a result of functionalities implemented by any of the components of processing engine(s) 308.

In an example, processing engine(s) 308 can include a network address list maintenance module 312, receive network address update module 314, and receive request for network address list module 316 and other engine(s) 318.

Other engine(s) 318 can implement functionalities that supplement applications or functions performed by system 206 or processing engine(s) 308.

In an embodiment, network address list maintenance module 312 maintains various dynamic IP address lists including deep detection lists and block lists. The deep detection lists may include NGFW deep detection list and DDoS deep detection list, which are lists of IP addresses for which associated network traffic may receive different treatment than the default security protection profile defined on NGFW device (e.g. gateway device, firewall device and UTM device) and DDoS mitigation device, respectively. Similarly, the block lists may include NGFW block list and DDoS block list, which refer to lists of IP addresses that are to be blocked by NGFW device and DDoS mitigation device, respectively.

In an embodiment, receive network address update module 314 receives updates from one or more network security devices participating in a cooperating group of network security devices. For example, various network security devices (e.g., a client device running an endpoint security solution, a gateway device, a firewall device, a DDoS mitigation appliance, a sandbox appliance, a messaging security appliance and a web application firewall) may apply a locally configured set of rules or an algorithm to observed network traffic and identify source and/or destination IP addresses to be added to one or more of the dynamic IP lists maintained by network address list maintenance module 312, thereby continuously updating the dynamic IP lists as the participating network security devices process network traffic.

In an embodiment, receive request for network address list module 316 receives requests from a participating NGFW device and/or a participating DDoS mitigation device for the current state of the dynamic IP address lists and provides these network devices with the requested IP address lists. In an example, the NGFW device and the DDoS mitigation device can periodically request and retrieve the appropriate dynamic IP lists from system 206 and can process (e.g., inspect, scan, filter, block, log, etc.) network traffic in accordance with explicit rules/actions to be applied to network traffic associated with an IP address on the dynamic IP lists to improve the catch rate and likelihood that attacks/malware are blocked by the cooperating group of network security devices.

Figure 4A:
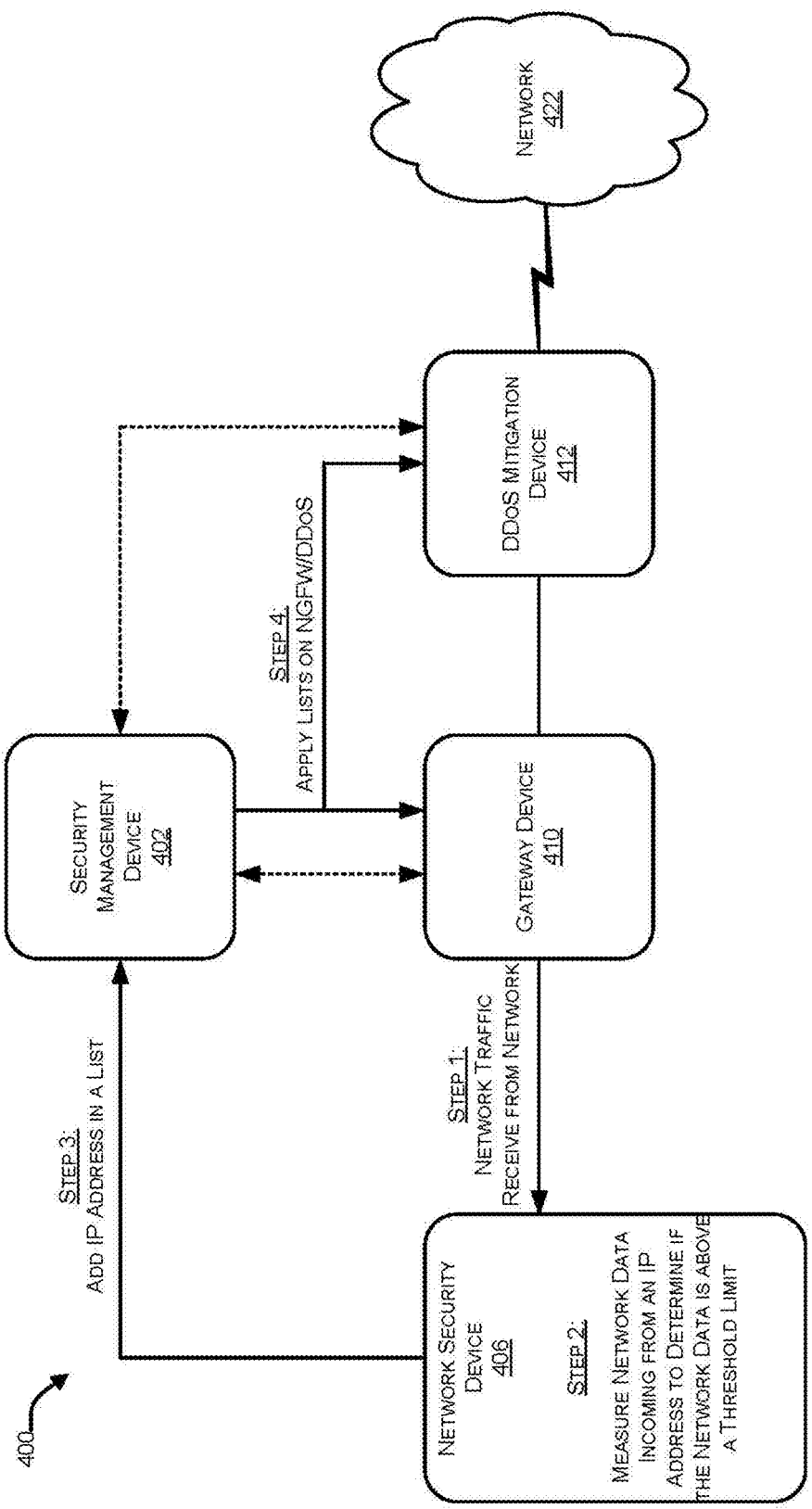
FIGS. 4A-B illustrate exemplary interactions among network security devices and a security management device in accordance with an embodiment of the present invention.

FIG. 4A illustrates exemplary interactions among network security devices 406, 410, and 412 and a security management device 402 in accordance with an embodiment of the present invention.

In context of the present example, at step 1 any of the participating network security devices of a group of cooperating network security devices, such as network security device 406, gateway device 410 and DDoS mitigation device 412 may receive network traffic from network 422. In one embodiment, these devices 406, 410 and 412 can direct security management device 402 to update (e.g., add an IP address to) one or more of the dynamic IP lists maintained by security management device 402 based on local algorithms/rules. For example, at step 2, network security device 406 may evaluate network traffic incoming from an IP address and determines whether certain measured data within a pre-defined period exceeds a predefined or configurable threshold. In the context of the present example, if the measured network data associated with a particular IP address exceeds the threshold, at step 3, network security device 406 directs security management device 402 to add the IP address to one or more dynamic IP address lists maintained by security management device 402. Responsive to the direction received from network security device 406, security management device 402 updates the dynamic IP address list(s).

Further, gateway device 410 and DDoS mitigation device 412 may periodically retrieve or receive one or more of the dynamic IP lists maintained by security management device 102 and thereafter make use of them in connection with their particular network security tasks. For example, at step 4, gateway device 410 may retrieve the NGFW deep detection list and/or the NGFW block list and DDoS mitigation device 412 may retrieve the DDoS deep detection list and/or the DDoS block list maintained by security management device 102 to process network traffic based on the current state of these dynamic IP lists.

While for simplicity in the context of the present example, only network security device 406 is shown as directing security management device 402 to add an IP address to one or more of the dynamic IP address lists maintained by security management device 402, those skilled in the art will appreciate that any or all of network security devices (406, 410 and/or 412) can add a specified IP address to one or more of the dynamic IP lists maintained by security management device 402.

Figure 4B:
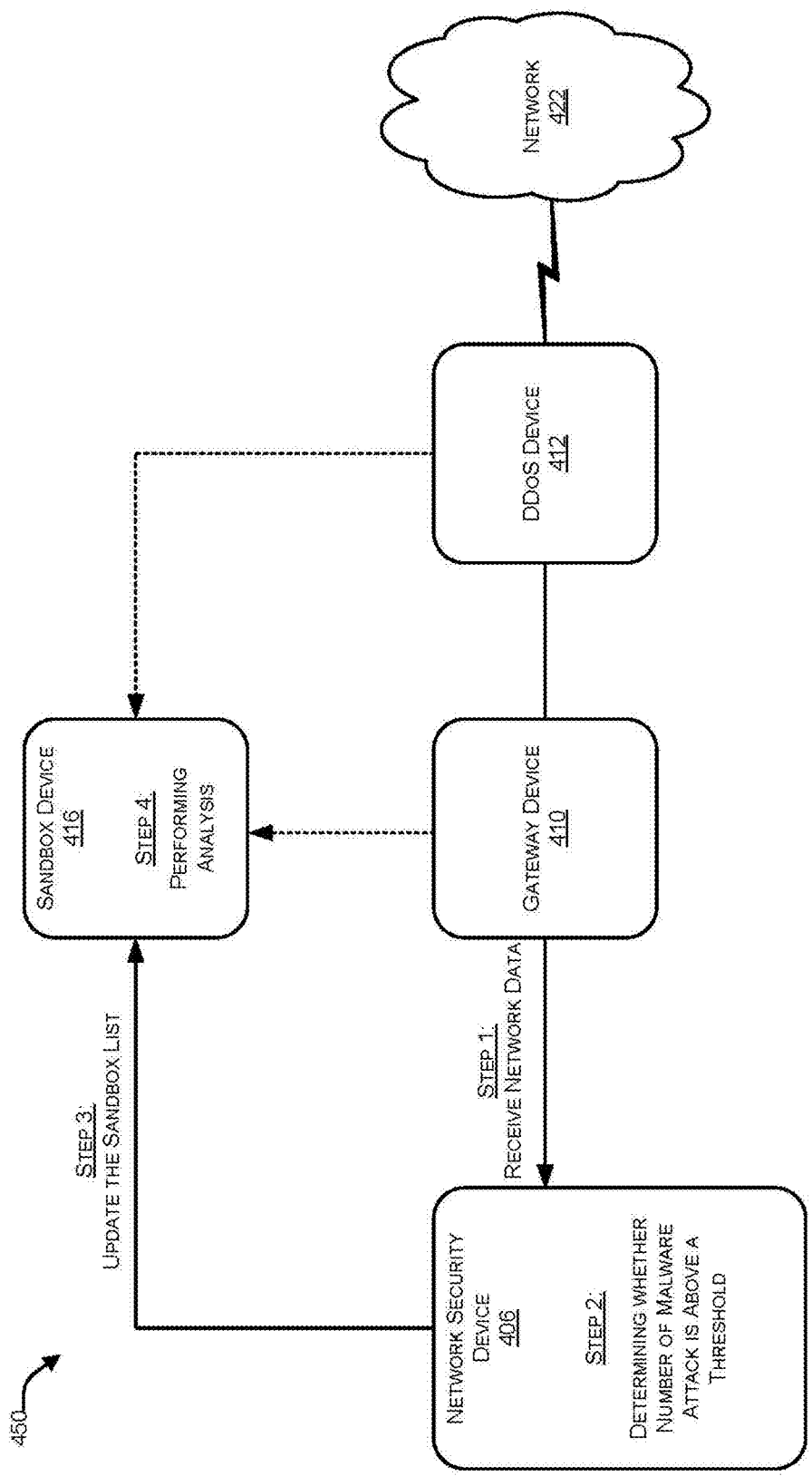

FIG. 4B illustrate exemplary interactions among network security devices 406, 410, 412 and 416 in accordance with an embodiment of the present invention.

In context of the present example, a dynamic hyper-sandbox list is locally maintained and applied by sandbox device 416. In a manner similar to the update of the dynamic IP lists maintained by security management device 402 of FIG. 4A, the dynamic hyper-sandbox list can be updated by various members of a cooperating group of network security devices and/or an endpoint security solution running on a client based on the application of local algorithms/rules to network traffic observed by the network security device at issue. In an example, any of a gateway device, a firewall device, a Unified Threat Management (UTM) appliance, an endpoint security solution running on a client device, a messaging security device and a web application firewall can direct sandbox device 416 to update the dynamic hyper-sandbox list by providing sandbox device 416 with an IP address, a subnet or an email address and a defined amount of time for which sandbox device is to maintain the IP address, the subnet or the email address on the dynamic hyper-sandbox list. For example, at step 1, any network security device participating in the group of cooperating network security devices, such as network security device 406, gateway device 410 and DDoS mitigation device 412, may receive network traffic from network 422. These devices 406, 410 and 412 can cause sandbox device 412 to update the dynamic hyper-sandbox list maintained by sandbox device 412 based on local algorithms/rules. For example, at step 2, network security device 406 may track statistics regarding one or more observed security events. For example, whether a number of malware attacks from any IP address is above a threshold. If the measured number of malware attacks from a particular IP address is above the threshold, at step 3, network security device 406 may direct sandbox device 416 to update the dynamic hyper-sandbox list by adding the particular IP address to the dynamic hyper-sandbox list maintained by sandbox device 416. Further, at step 4, sandbox device 416 may use a scan profile and/or pre-filter settings in connection with performing a behavior analysis of a file associated with an IP address, a subnet or an email address on the dynamic hyper-sandbox list. In this manner, members of the group of cooperating network security devices can impact the level of scrutiny applied by sandbox device to files associated with reported IP addresses, subnets or email addresses for the time period such reported IP addresses, subnets or email addresses are maintained on the dynamic hyper-sandbox list.

While for simplicity in the context of the present example, only network security device 406 is shown as directing sandbox device 416 to add an IP address, subnet or an email address to the dynamic hyper-sandbox list, those skilled in the art will appreciate that any or all of network security devices (406, 410 and/or 412) can add a specified IP address IP, subnet or email address to the dynamic hyper-sandbox list.

FIG. 5 illustrates an exemplary administrative security policy configuration interface 500 for a NGFW device (in the form of any of a gateway device, a firewall device or a UTM appliance) in accordance with an embodiment of the present invention.

In context of the present example, a network administrator of a NGFW device can associate certain actions and/or security protection profiles with pairs of source IP addresses and destination IP addresses. For example, according to entry 502, when DNS, HTTP and/or HTTPS network traffic is received from a source IP address that is on the NGFW block list, the action may be defined to block (e.g., DENY) the network traffic. Further, in another non-limiting example, according to entry 504, when DNS, HTTP and/or HTTPS network traffic associated with one or more classes of applications (e.g., Business, Cloud.IT and/or Collaboration) is received from a source IP address that is on the NGFW deep detection list, the action may be defined to allow (e.g., ACCEPT) the network traffic subject to application of one or more antivirus (AV), Intrusion Prevention System (IPS), Access Control (AC) profiles specified by the administrator of the NGFW device. Similarly, in yet another example, according to entry 506, when DNS, HTTP and/or HTTPS network traffic associated with one or more classes of applications (e.g., Business, Cloud.IT and/or Collaboration) is received from a source IP address that is on the VIPB list, the action may be defined to allow (e.g., ACCEPT) the network traffic subject to application of one or more AV, IPS, AC profiles specified by the administrator of the NGFW device.

FIG. 6 illustrates an exemplary administrative security policy configuration interface 600 for a DDoS mitigation device in accordance with an embodiment of the present invention.

In context of the present example, a network administrator of a DDoS mitigation device can associate a security protection profile (SPP) with IP addresses on one of three different lists (e.g., a block list, a deep detection list or a VIPB list). For example, in accordance with entry 602, when network traffic associated with an IP address that is on the DDoS block list, the network traffic is processed by the DDoS mitigation device in accordance with the "Block" SPP. In another non-limiting example, in accordance with entry 604, when network traffic is received that is associated with an IP address that is on the DDoS deep detection list, the network traffic is processed by the DDoS mitigation device in accordance with an SPP assigned by the network administrator (e.g., "SPP-1"). In yet another example, in accordance with entry 606, when network traffic is received that is associated with an IP address that is on the VIPB list, the network traffic is processed by the DDoS mitigation device in accordance with another SPP assigned by the network administrator (e.g., "SPP-2").

Figure 7A:
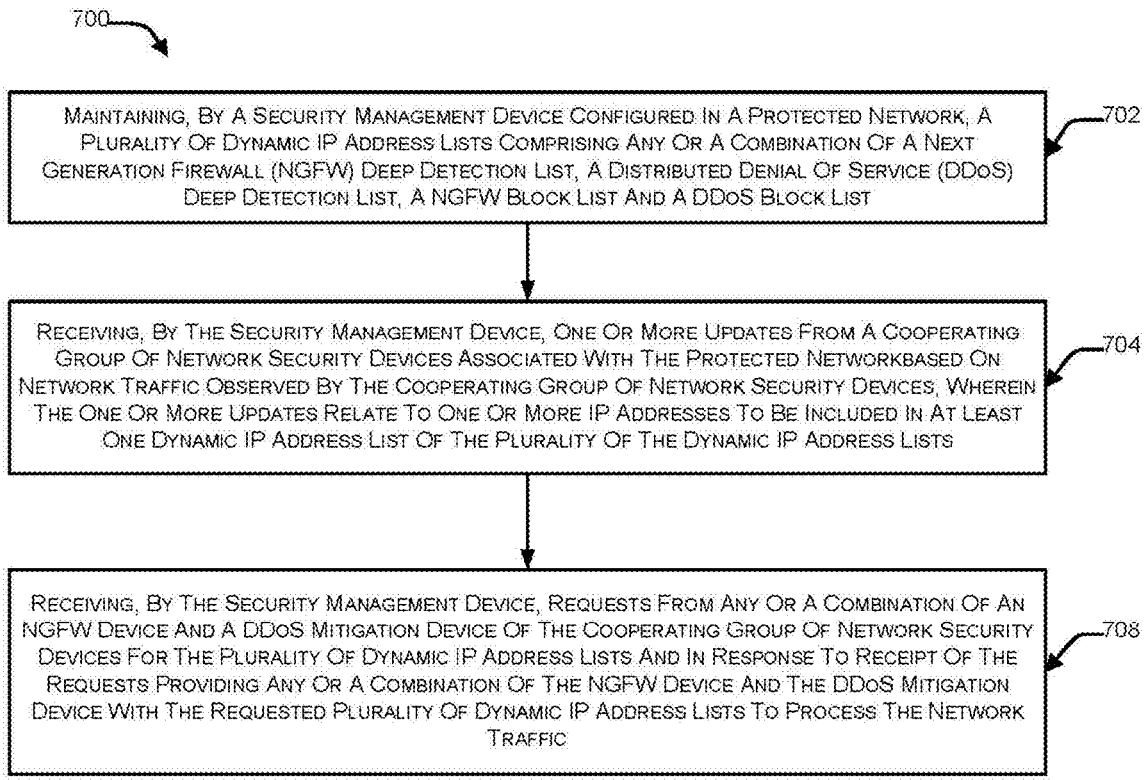
FIG. 7A is a flow diagram illustrating a high-level process performed by a security management device in accordance with an embodiment of the present invention.

FIG. 7A is a flow diagram 700 illustrating high-level process performed by a security management device in accordance with an embodiment of the present invention.

In the context of the present example, at block 702, the security management device configured in a protected network, maintains multiple dynamic IP address lists including any or a combination of a NGFW deep detection list, a DDoS deep detection list, a NGFW block list and a DDoS block list. At block 704, the security management device, receives one or more updates from a member of a cooperating group of network security devices associated with the protected network based on network traffic observed by the member. The updates relate to one or more IP addresses to be included in at least one dynamic IP address list of the multiple dynamic IP address lists.

Further, at block 708, the security management device receives requests from any or a combination of an NGFW device and a DDoS mitigation device of the cooperating group of network security devices for one or more of the multiple dynamic IP address lists and in response to receipt of the requests, the security management device, provides the requestor with the requested dynamic IP address lists.

Figure 7B:
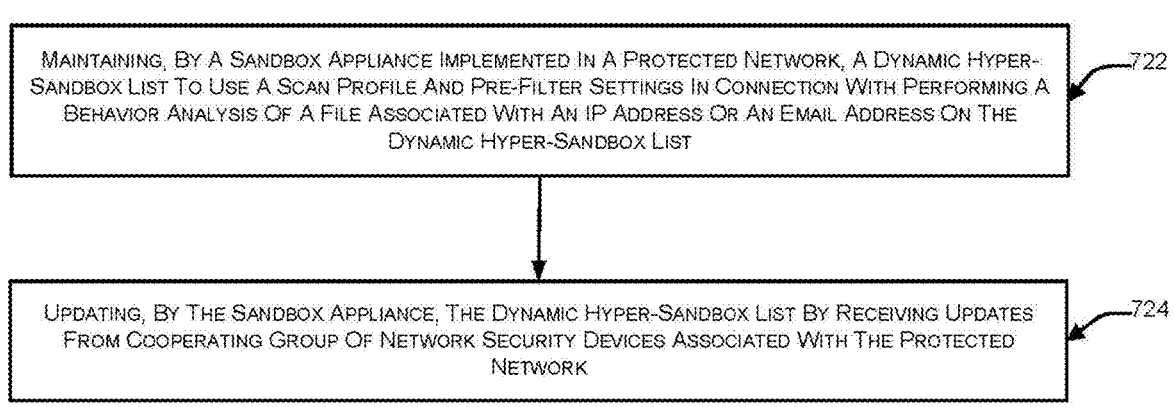
FIG. 7B is a flow diagram illustrating a high-level process performed by a sandbox device in accordance with an embodiment of the present invention.

FIG. 7B is a flow diagram 720 illustrating high-level process performed by a sandbox device in accordance with an embodiment of the present invention.

In the context of the present example, at block 722, the sandbox appliance implemented in a protected network, maintains a dynamic hyper-sandbox list to determine a scan profile and/or pre-filter settings in connection with performing a behavior analysis of a file associated with an IP address, a subnet or an email address on the dynamic hyper-sandbox list. Further, at block 724, the sandbox appliance updates the dynamic hyper-sandbox list by receiving updates from cooperating group of network security devices associated with the protected network.

Figure 7C:
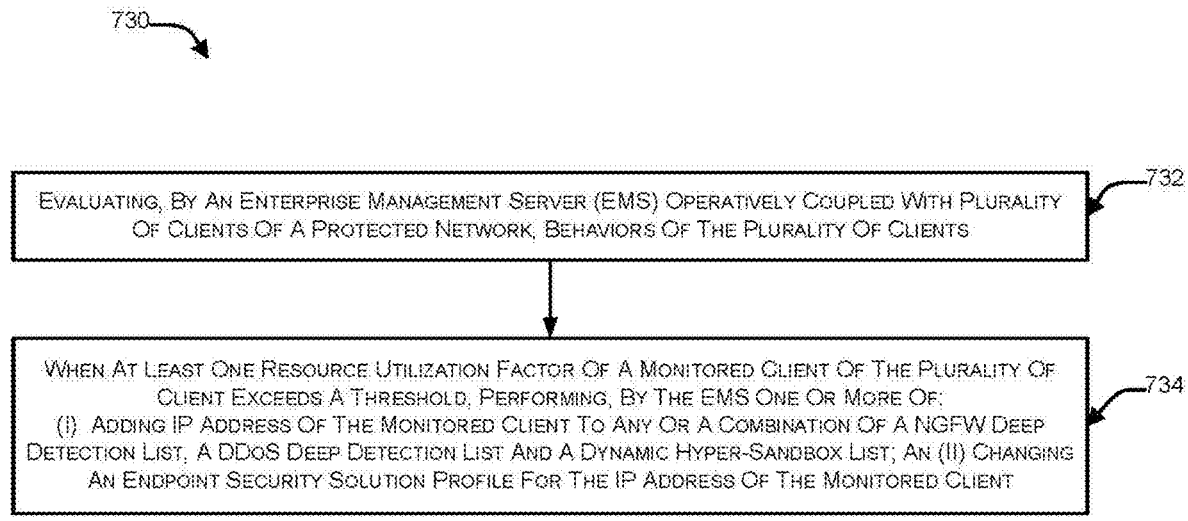
FIG. 7C is a flow diagram illustrating a high-level process performed by an EMS in accordance with an embodiment of the present invention.

FIG. 7C is a flow diagram 730 illustrating high-level process performed by a EMS in accordance with an embodiment of the present invention.

In the context of the present example, at block 732, the EMS operatively coupled with multiple clients of a protected network, evaluates behaviors exhibited by the clients.

Further, at block 734, when at least one resource utilization factor of a monitored client of the multiple clients exceeds a threshold, the EMS performs one or more of: (i) adding the IP address of the monitored client to one or more of a NGFW deep detection list, a DDoS deep detection list and a dynamic hyper-sandbox list; and (ii) changing an endpoint security solution profile for the IP address of the monitored client.

Figure 8:
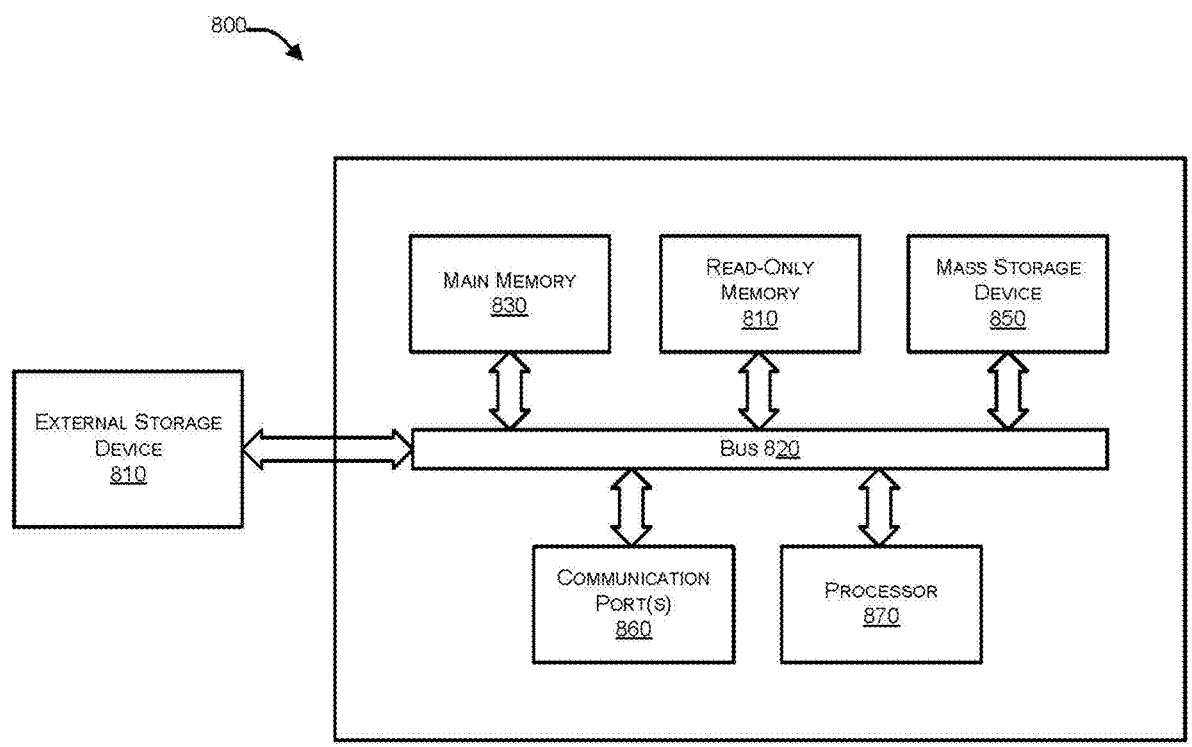
FIG. 8 illustrates an exemplary computer system in which or with which embodiments of the present invention may be utilized in accordance with embodiments of the present disclosure.

FIG. 8 illustrates an exemplary computer system 800 in which or with which embodiments of the present invention may be utilized in accordance with embodiments of the present disclosure.

As shown in FIG. 8, computer system includes an external storage device 810, a bus 820, a main memory 830, a read only memory 840, a mass storage device 850, a communication port 860, and a processor 870. Computer system may represent all or some portion of any of the network security devices described herein (e.g., client device 106, access point device 104, switching device 108, gateway device 110 or 410, DDoS mitigation device 112 or 412, messaging security device 114, sandbox device 116 or 416, or web application firewall device 118), an enterprise management server (e.g., enterprise management server 122), or a security management device (e.g., security management device 102, 204 or 402).

Those skilled in the art will appreciate that computer system 800 may include more than one processor 870 and communication ports 860. Examples of processor 870 include, but are not limited to, an Intel® Itanium® or Itanium 2 processor(s), or AMD® Opteron® or Athlon MP® processor(s), Motorola® lines of processors, Forti-SOC™ system on a chip processors or other future processors. Processor 870 may include various modules associated with embodiments of the present invention.

Communication port 860 can be any of an RS-232 port for use with a modem based dialup connection, a 10/100 Ethernet port, a Gigabit or 10 Gigabit port using copper or fiber, a serial port, a parallel port, or other existing or future ports. Communication port 860 may be chosen depending on a network, such a Local Area Network (LAN), Wide Area Network (WAN), or any network to which computer system connects.

Memory 830 can be Random Access Memory (RAM), or any other dynamic storage device commonly known in the art. Read only memory 840 can be any static storage device(s) e.g., but not limited to, a Programmable Read Only Memory (PROM) chips for storing static information e.g. start-up or BIOS instructions for processor 870.

Mass storage 850 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 820 communicatively couples processor(s) 870 with the other memory, storage and communication blocks. Bus 820 can be, e.g. a Peripheral Component Interconnect (PCI)/ PCI Extended (PCI-X) bus, Small Computer System Interface (SCSI), USB or the like, for connecting expansion cards, drives and other subsystems as well as other buses, such a front side bus (FSB), which connects processor 870 to software system.

Optionally, operator and administrative interfaces, e.g. a display, keyboard, and a cursor control device, may also be coupled to bus 820 to support direct operator interaction with computer system. Other operator and administrative interfaces can be provided through network connections connected through communication port 860. External storage device 810 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
   maintaining, by a security management device configured in a protected network, a plurality of dynamic IP address lists comprising a next generation firewall (NGFW) deep detection list, a Distributed Denial of Service (DDoS) deep detection list, a NGFW block list and a DDoS block list;
   receiving, by the security management device, one or more updates from a cooperating group of network security devices associated with the protected network based on network traffic observed by the cooperating group of network security devices, wherein the one or more updates relate to one or more IP addresses to be included in at least one dynamic IP address list of the plurality of the dynamic IP address lists; and
   receiving, by the security management device, requests from any or a combination of an NGFW device and a DDoS mitigation device of the cooperating group of network security devices for the plurality of dynamic IP address lists and in response to receipt of the request providing any or a combination of the NGFW device and the DDoS mitigation device with the requested plurality of dynamic IP address lists to process the network traffic.

2. The method of claim 1, wherein the cooperating group of network security devices further comprise any or a combination of a client device running an endpoint security solution, a gateway device, a firewall device, a sandbox appliance, a messaging security appliance and a web application firewall.

3. The method of claim 2, wherein the sandbox appliance maintains a dynamic hyper-sandbox list to use a scan profile and pre-filter settings in connection with performing a behavior analysis of a file associated with an IP address or an email address on the dynamic hyper-sandbox list.

4. The method of claim 3, wherein the dynamic hyper-sandbox list is updated by the cooperating group of network security devices.

5. The method of claim 3, wherein the client device is operatively coupled with an enterprise management server (EMS) configured to evaluate behaviors of plurality of clients within the protected network and when at least one resource utilization factor of a monitored client of the plurality of client exceeds a threshold, the EMS performs one or more of:
  adding IP address of the monitored client to any or a combination of the NGFW deep detection list, the DDoS deep detection list and the dynamic hyper-sandbox list; and
  changing the endpoint security solution profile for the IP address of the monitored client.

6. The method of claim 5, wherein the at least one resource utilization factor is determined based on any or a combination of a process list, a processing power utilization for each process defined in the process list, and a network utilization for each process defined in the process list.

7. The method of claim 1, wherein plurality of dynamic IP address lists are intended to configure any or a combination of the NGFW device and the DDoS mitigation device.

8. The method of claim 1, wherein each network security device of the cooperating group of network security devices apply a locally configured set of rules or an algorithm to observe the network traffic to identify source and/or destination Internet Protocol (IP) addresses to be added to the at least one dynamic IP lists.

9. The method of claim 1, wherein any or a combination of the NGFW device and the DDoS mitigation device periodically retrieves the at least one dynamic IP lists from the plurality of dynamic IP lists maintained by the security management device.

10. The method of claim 1, wherein the any or a combination of the NGFW device and the DDoS mitigation device processes the network traffic in accordance with explicit rules/actions to be applied to the network traffic associated with an IP address based on the retrieved at least one dynamic IP lists.

11. A non-transitory computer-readable storage medium embodying a set of instructions, which when executed by one or more processors of a security management device protecting a network, causes the one or more processors to perform a method comprising:
  maintaining a plurality of dynamic IP address lists comprising a next generation firewall (NGFW) deep detection list, a Distributed Denial of Service (DDoS) deep detection list, a NGFW block list and a DDoS block list;
  receiving one or more updates from a cooperating group of network security devices associated with the protected network based on network traffic observed by the cooperating group of network security devices, wherein the one or more updates relate to one or more IP addresses to be included in at least one dynamic IP address list of the plurality of the dynamic IP address lists; and
  receiving requests from any or a combination of an NGFW device and a DDoS mitigation device of the cooperating group of network security devices for the plurality of dynamic IP address lists and in response to receipt of the requests, providing any or a combination of the NGFW device and the DDoS mitigation device with the requested plurality of dynamic IP address lists to process the network traffic.

12. The non-transitory computer-readable storage medium of claim 11, wherein the cooperating group of network security devices further comprise any or a combination of a client device running an endpoint security solution, a gateway device, a firewall device, a sandbox appliance, a messaging security appliance and a web application firewall.

* * * * *